United States Patent [19]

Cope et al.

[11] 3,708,136

[45] Jan. 2, 1973

[54] MAGNETIC TAPE UNIT HAVING A PNEUMATIC REEL HUB

[75] Inventors: James R. Cope; Paul F. Smith, both of Boulder, Colo.

[73] Assignee: International Business Machines Corporation, Armonk, N.Y.

[22] Filed: Jan. 21, 1971

[21] Appl. No.: 108,486

[52] U.S. Cl. ..................................242/68.3, 242/182

[51] Int. Cl. ..............................................B65h 19/02

[58] Field of Search......242/68.3, 68.1, 182, 210, 72, 242/72.1

[56] References Cited

UNITED STATES PATENTS

| | | | |
|---|---|---|---|
| 3,542,305 | 11/1970 | Feierabend | 242/68.3 |
| 2,923,489 | 2/1960 | Bunch | 242/68.3 |
| 3,278,133 | 10/1966 | Froehlich | 242/68.3 |
| 3,532,286 | 10/1970 | Mallette | 242/68.3 |

*Primary Examiner*—George F. Mautz
*Attorney*—Hanifin & Jancin and F. A. Sirr

[57] ABSTRACT

A magnetic tape unit includes a source of air pressure to pressurize components of the tape unit, such as air bearings, and to actuate a tape reel drive hub, automatically coupling a reel of tape onto the hub.

The pneumatically actuated drive hub includes first and second disk-shaped walls which are axially fixed at spaced positions along a motor drive shaft. One of these walls covers the end of the shaft and is of a small diameter, to allow a reel to be placed on the drive hub. The other wall encircles the shaft, is of a large diameter, and includes an annular positioning shoulder against which the reel is axially seated. A third axially movable wall is positioned intermediate the two fixed walls. This wall is spring biased toward the first wall. A closed chamber between the movable wall and the first wall is connected to the source of air pressure, so that when the chamber is pressurized, the movable wall moves toward the second wall. This movement expands a resilient ring which engages the mounting opening in the reel, to thereby couple the reel to the drive hub.

15 Claims, 6 Drawing Figures

INVENTORS
JAMES R. COPE
PAUL F. SMITH
BY
ATTORNEY

MAGNETIC TAPE UNIT HAVING A PNEUMATIC REEL HUB

BACKGROUND AND SUMMARY OF THE INVENTION

The prior art discloses a magnetic tape unit having a reel drive hub which is actuated as a result of operation of the pneumatic portion of the tape unit. In this prior art, the operator places a reel on the drive hub, and actuates a start or load button, whereupon various mechanisms of the tape unit are actuated. As a result of the energization of the pneumatic portion of the tape unit, the reel is coupled to the drive hub prior to energization of a reel drive motor.

This prior art provides a piston-like member which is displaced from the drive hub and is connected thereto by a mechanical linkage.

The present invention provides an improved pneumatically actuated reel drive hub wherein the actuating member is incorporated within the drive hub itself.

Specifically, the present invention provides a drive hub having two spaced wall members and an intermediate wall member. The two outer walls are fixed in position and define the drive hub. An expandable band-like member encircles the space between these two walls. The intermediate wall is moved pneumatically, and this movement is effective to expand the band-like member to the diameter of the reel mounting opening.

Additional features of the present invention include; an annular positioning shoulder carried by the inner fixed wall, against which the reel is centered; a plurality of spring-loaded catches carried by the inner wall and spaced from the positioning shoulder by a distance slightly less than the width of a reel, to thus hold the reel against the shoulder; a spring which biases the movable wall toward the outer wall; and a movable collar structure, encircled by a rubber belt, which is moved radially outward by cam surfaces carried by the movable wall, to thus expand the rubber belt.

The foregoing and other features and advantages of the invention will be apparent from the following more particular description of a preferred embodiment of the invention, as illustrated in the accompanying drawings.

DESCRIPTION OF THE PREFERRED EMBODIMENT

Figure 1:
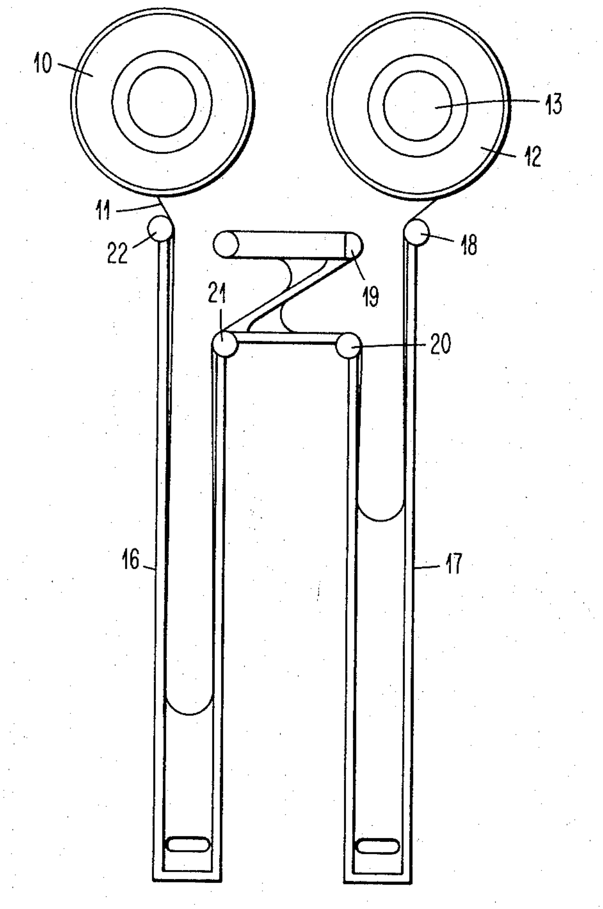
FIG. 1 is a front view of a magnetic tape unit embodying the present invention.

The magnetic tape unit of FIG. 1 includes a machine reel 10 which is permanently mounted on the shaft of a reversible electric motor, not shown, and is adapted to receive magnetic tape 11 as the tape moves in a forward direction, leaving a removable file reel 12 and accumulating on the machine reel.

The operator of the magnetic tape unit selects a reel 12 and manually places it on drive hub 13. Within the teachings of this invention, the tape unit may be of the type requiring manual threading of the tape, or of the type having automatic threading. The operator next pushes a "start" or "load" button 28, FIG. 2, to initiate operation of the tape unit.

Figure 2:
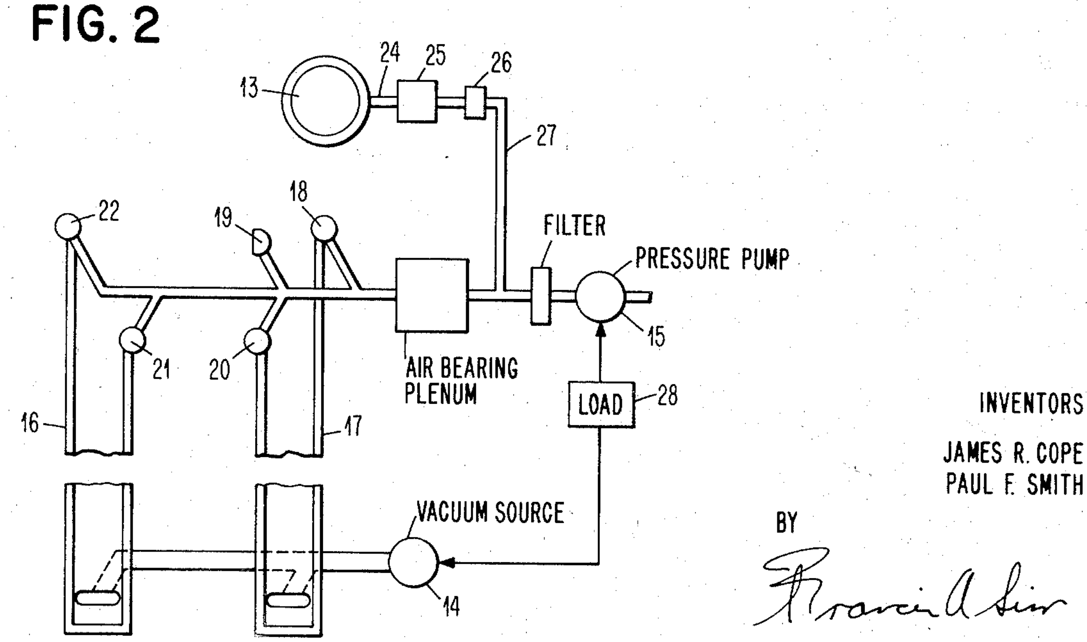
FIG. 2 is a schematic showing of the pneumatic system of the tape unit of FIG. 1.

Those skilled in the art will appreciate that a number of functions are initiated when the load button is pushed. FIG. 2 is a simplified showing of the pneumatic system of the tape unit of FIG. 1. One of the many function initiated by the load button is the energization of vacuum pump 14 and pressure pump 15. In order to simplify the showing of FIG. 2, vacuum pump 14 is shown as supplying vacuum only to vacuum columns 16 and 17, and pressure pump 15 is shown as supplying air under pressure only to air bearings 18–22 and to drive hub 13. As those skilled in the art will appreciate, other tape unit components, not shown, also utilize the vacuum and positive pressure supplied by pumps 14 and 15.

As will be apparent, FIGS. 1 and 2 disclose a feature of the present invention whereby the improved magnetic tape unit disclosed therein includes a reel drive hub which is automatically actuated as a function of the status of the tape unit, namely the pushing of load button 28.

Figure 3:
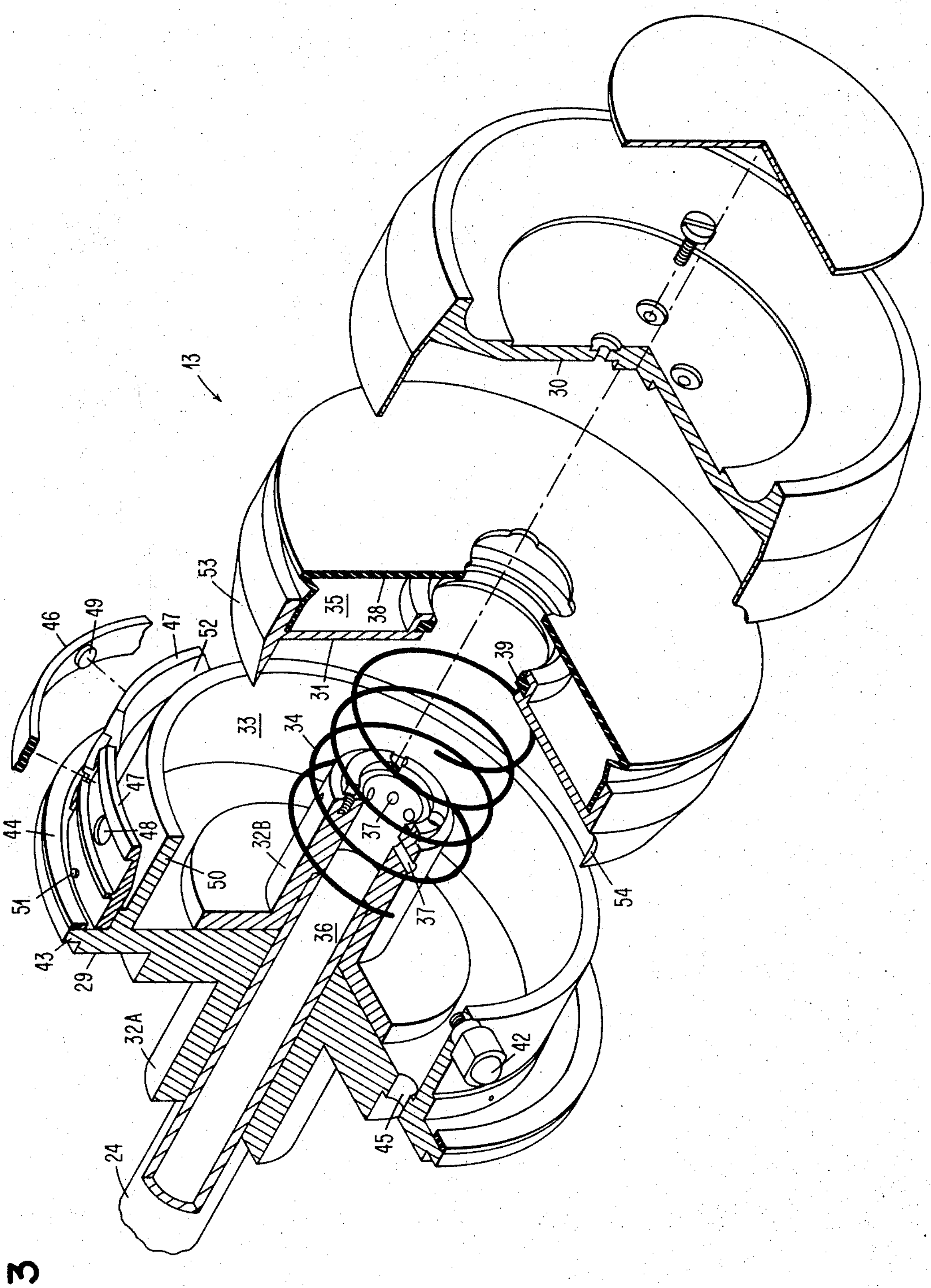
FIG. 3 is an exploded perspective view of the drive hub of FIG. 2.

Referring to FIG. 2, drive hub 13 is reversibly driven by an electric motor 25 having a hollow drive shaft 24 connected to hub 13. This shaft is rotationally fixed in position by the mounting of motor 25 on the back side of the front panel (not shown) of the tape unit. The forward end of shaft 24 extends through an opening in this panel and drive hub 13 is secured to that end of the shaft. Shaft 24 is hollow, as can be seen in FIG. 3, and the back end of the shaft terminates in plenum chamber 26. This chamber is fixed in position and connects to shaft 24 by means of a sealed bearing, not shown. Chamber 26 connects to conduit 27 which transmits air under pressure to chamber 26 and to hub 13 by way of motor shaft 24.

Figure 4:
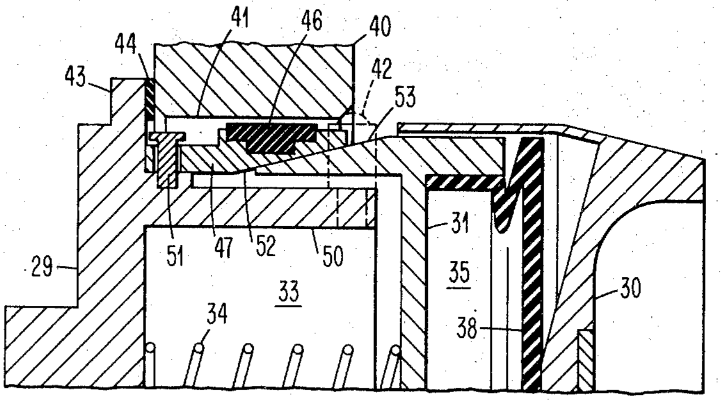
FIG. 4 is a partial section view of the drive hub of FIG. 3, showing a reel in position on the hub, and showing the rubber belt in its relaxed condition.

Referring to FIG. 3, drive hub 13 includes three disk-shaped wall members 29, 30 and 31. Wall member 29 includes a pair of hollow axially extending boss portions 32A and 32B. Boss members 32A and 32B define a centrally located and axially extending opening which receives motor shaft 24, to which hub 13 is attached, by means not shown. Boss portion 32B terminates in a portion which mates with disk-shaped wall 30, wall 30 being attached at this point to rotate with wall 29 as shaft 24 rotates. Movable wall 31 is mounted intermediate walls 29 and 30 and is axially movable with the respect of these walls. The space 33, between walls 29 and 31, is exposed to ambient air pressure by means such as opening 45 and houses a spring 34 which biases wall 31 to a stable position toward wall 30. FIG. 4 shows the relationship between walls 29, 30 and 31 when wall 31 is in its stable position; that is, without chamber 35 pressurized. Chamber 35 between walls 30 and 31 is connected to space 36, adjacent the forward end of motor shaft 24, by a plurality of openings 37 formed about the circumference of boss 32B.

An air tight expandable bladder 38 and a seal 39 close chamber 35, while allowing movement of wall 31. When wall 31 is in the stable position shown in FIG. 4, seal 39 is positioned to the left of openings 37, as viewed in FIG. 3. Thus, openings 37 at all times communicate only with chamber 35. As mentioned, plenum chamber 26 is connected to the tape unit air pressure source 15 and the energization of this source is effective to pressurized chamber 35 by way of conduit 27, plenum chamber 26, hollow motor shaft 24, and openings 37. This pressure causes wall 31 to move toward wall 29, against the bias force exerted by spring 34. While the position of wall 31 as shown in FIG. 4 is a stable position, the position to which it is moved to the left by air pressure in chamber 35 is an unstable position, see FIG. 5. That is, a release of this pressure causes the wall to return to its FIG. 4 stable position.

Reference numeral 40 identifies a cut away portion of a conventional tape reel having a circular reel mounting opening defined by wall 41. The diameter of this reel mounting opening is somewhat larger than the diameter of walls 30 and 31, and thus the reel can be easily positioned on drive hub 13 by sliding the reel over wall 30 into engagement with a plurality of fixed-position springloaded catches 42. These catches are located about the circumference of drive hub 13, for example one catch every one hundred and twenty degrees. Catches 42 in their radially extended position, define an imaginary circle whose diameter is greater than the diameter of reel mounting opening 41. Thus, it is necessary that the operator of the magnetic tape unit depress reel 40 axially, causing spring-loaded catches 42 to move inwardly until such time as reel 40 snaps into the position shown in FIG. 4. In this position, reel 40 is positioned against an annular positioning shoulder 43 formed as a radially extended shoulder on wall 29 which carries an annular resilient rubber-like surface 44.

Immediately underneath reel 40, once it is positioned as shown in FIG. 4, is a flexible drive band such as an expandable rubber belt 46.

Belt 46 is carried by a plurality of individual arcuate shaped sectors 47, each of which includes a recess 48 to receive a boss 49 formed on the underside of belt 46. The plurality of sectors 47 define an annular surface which extends axially from one side of wall 29 to define a reel mounting surface. Each of the sectors 47 is loosely attached to an annular axially extending wall 50 by means of a pin 51. This loose attachment allows sectors 47 to move radially outward from the position shown in FIG. 4 to the position shown in FIG. 5, as will be explained.

Each of the sectors 47 also include a cam surface 52 which mates with a cam surface 53 formed as an extension of movable wall 31. Wall 31 is formed with a plurality of notches 54 (FIG. 3) which provide clearance and allow movement of wall 31 with respect to catches 42. When wall 31 moves to the left, to the unstable position shown in FIG. 5, cam surface 53 causes sectors 47 to radially, expand, causing rubber drive belt 46 to be compressed against reel opening 41, to tightly couple reel 40 to drive hub 13.

Figure 5:
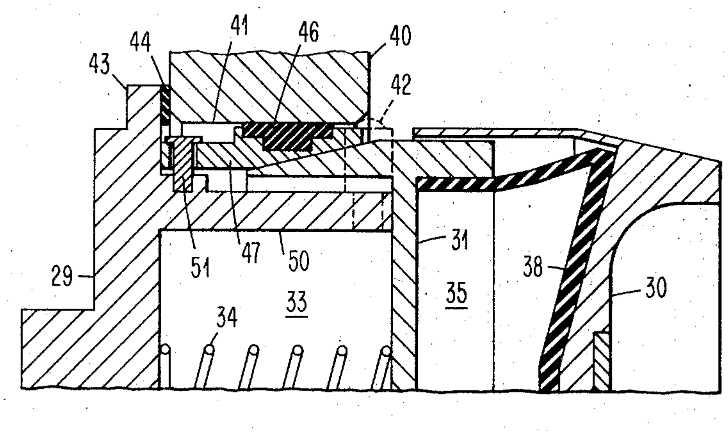
FIG. 5 is a view similar to FIG. 4, showing the rubber belt in its expanded condition.
Figure 6:
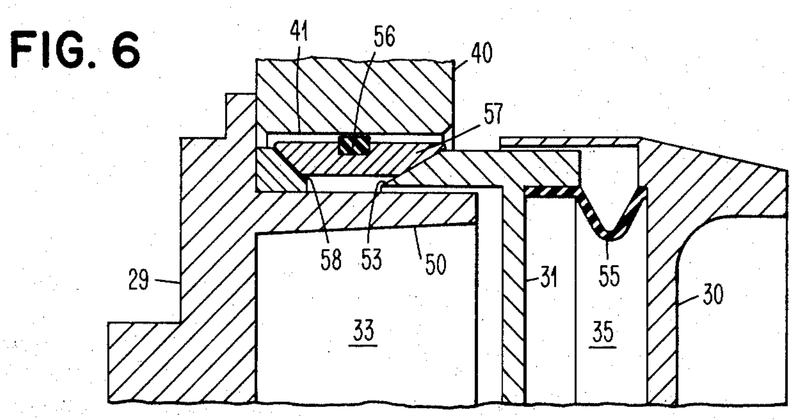
FIG. 6 is a view similar to FIG. 4, showing a modified movable collar and a modified pneumatic chamber.

FIG. 6 discloses a modification of the present invention whereby chambers 33 and 35 are again defined by walls 29, 30 and 31. However, in this modification, chamber 35 does not include a cup-shaped bladder 38 such as shown in FIGS. 3, 4 and 5, but rather utilizes an annular ring-shaped bladder 55 which attaches movable wall 31 to fixed wall 30. The hub of FIG. 6 is shown in its stable position, that is, with chamber 35 at ambient pressure. In this modification, a rubber drive belt 56 is supported by a split metallic ring 57 which encircles the major portion of the 360° of annular wall 50. Ring 57 performs the function of the plurality of sectors 47 of FIGS. 3, 4 and 5 and likewise defined an annular surface which extends axially from one side of wall 29 to define a reel mounting surface. Ring 57 is supported by cam surface 53 carried by wall 31 and by another cam surface 58 carried by wall 29 and its annular wall 50. Ring 57 is shown in its relaxed position where it has forced wall 31 to its stable position. Thus, ring 57 both supports belt 56 and biases wall 31 to its stable position.

When chamber 35 is pressurized, as described, wall 31 moves to the left, ring 57 expands radially, and drive belt 56 is compressed against reel mounting opening 41.

While the invention has been particularly shown and described with reference to a preferred embodiment thereof, it will be understood by those skilled in the art that various changes in form and details may be made therein without departing from the spirit and scope of the invention.

What is claimed is:

1. A reel drive hub adapted to receive the mounting opening of a reel to be mounted thereon, the drive hub comprising:

a first fixed-position disk-shaped wall having a diameter greater than the reel mounting opening, and having an annular surface axially extending from one side thereof to define a reel mounting surface, the portion of the wall which extends radially beyond said annular surface defining a positioning shoulder against which the reel may be axially positioned, a second fixed-position disk-shaped wall having a diameter less than the reel mounting opening, mounted in axial alignment with said first wall and spaced from said one side of said first wall, an axially movable wall mounted intermediate said first and second walls, means biasing said movable wall to a first position, pneumatic means mounted between said movable wall and one of said fixed walls, air-flow conduit means connected to said pneumatic means operable to energize said pneumatic means and thereby move said movable wall to a second position in opposition to said biasing means, and means associated with said annular surface and actuatable upon movement of said movable wall to said second position to couple a reel to the drive hub.

2. A drive hub as defined in claim 1 wherein said first position is a stable position, and wherein said second position is an unstable position, said movable wall thereby automatically returning to said stable position upon deenergization of said pneumatic means.

3. A drive hub as defined in claim 2 including means coupling said walls to a motor drive shaft to rotate therewith.

4. A drive hub as defined in claim 3 wherein said means associated with said annular surface includes a resilient band encircling said annular surface, and wherein movement of said movable wall to said unstable position expands said band to the diameter of the reel mounting opening.

5. A drive hub as defined in claim 4 wherein said movable wall includes cam means operable upon movement of said movable wall to said unstable position to expand said band.

6. A drive hub as defined in claim 5 wherein said means associated with said annular surface includes further cam means which is encircled by said band, said further cam means mating with the cam means of said movable wall.

7. A drive hub as defined in claim 6 wherein said biasing means includes spring means cooperating with said first wall and said movable wall to bias said movable wall toward said second wall to said stable position.

8. A drive hub as defined in claim 7 wherein pneumatic means includes flexible seal means forming a closed pneumatic chamber between said movable wall and said second wall, and wherein said conduit means connects said chamber to a pneumatic energizing source.

9. A drive hub as defined in claim 8 wherein said motor drive shaft is hollow and constitutes a portion of said conduit means connecting said chamber to said pneumatic source.

10. A drive hub as defined in claim 9 including a plurality of spring loaded catch means mounted about the circumference of said annular surface and spaced from said positioning shoulder by a distance approximately equal to the thickness of a reel, said plurality of catch means defining a circle whose diameter is greater than the reel mounting opening.

11. In a magnetic tape unit, a source of air pressure, air utilization means connected to said source, control means operable upon a need for operation of the magnetic tape unit to render said source operable, and a rotatable reel drive hub adapted to receive a reel of magnetic tape and having means defining an axis of rotation, a first reel positioning wall axially fixed in position along said axis, a second wall spaced from said first wall and axially fixed in position along said axis, a third axially movable wall intermediate said first and second walls, means forming a variable volume closed chamber between said third wall and one of said first and second walls, conduit means connecting said chamber to said source of air pressure to change the pressure therein in a manner to move said third wall toward said first wall, and means controlled by movement of said third wall toward said first wall adapted to couple a reel to the drive hub.

12. A magnetic tape unit as defined in claim 11 wherein said air utilization means includes air bearings, wherein said closed chamber includes a flexible sealing wall operable to form said closed chamber between said second and third walls, and wherein force bias means is effective between said third and first walls to continuously bias said third wall toward said second wall to a stable position.

13. A magnetic tape unit as defined in claim 12 wherein said first wall includes a radially extending surface against which a reel may be axially positioned, an axially extending annular surface, an expandable ring carried by said annular surface, and cam means actuated by said third wall to expand said ring as said third wall moves toward said first wall to an unstable position.

14. A magnetic tape unit as defined in claim 13 including further cam means associated with said annular surface and carrying said expandable ring, and wherein said further cam means cooperates with said cam means actuated by said third wall.

15. A magnetic tape unit as defined in claim 14 wherein said annular surface includes a plurality of spring-biased catches spaced from said radially extending surface by a distance approximately equal to the width of a reel, said catches defining a circle whose diameter is greater than the mounting opening in the reel, said catches functioning to hold the reel axially against said radially extending surface.

* * * * *